United States Patent
Bolognese et al.

(10) Patent No.: US 10,376,093 B2
(45) Date of Patent: Aug. 13, 2019

(54) MACHINE FOR PREPARING LIQUID PRODUCTS, IN PARTICULAR VIA CAPSULES

(71) Applicant: LUIGI LAVAZZA S.p.A., Turin (IT)

(72) Inventors: Danilo Bolognese, Turin (IT); Alberto Cabilli, Moncalieri (IT); Denis Rotta, Dronero (IT); Luca Bugnano, Moncalieri (IT)

(73) Assignee: LUIGI LAVAZZA S.p.A., Turin (IT)

( * ) Notice: Subject to any disclaimer, the term of this patent is extended or adjusted under 35 U.S.C. 154(b) by 359 days.

(21) Appl. No.: 15/126,284

(22) PCT Filed: Mar. 16, 2015

(86) PCT No.: PCT/IB2015/051899
§ 371 (c)(1),
(2) Date: Sep. 14, 2016

(87) PCT Pub. No.: WO2015/140688
PCT Pub. Date: Sep. 24, 2015

(65) Prior Publication Data
US 2017/0086619 A1    Mar. 30, 2017

(30) Foreign Application Priority Data
Mar. 19, 2014  (IT) .............................. TO2014A0227

(51) Int. Cl.
*A47J 31/40*    (2006.01)
*A47J 31/46*    (2006.01)
(Continued)

(52) U.S. Cl.
CPC ............. *A47J 31/46* (2013.01); *A47J 31/402* (2013.01); *F04B 17/03* (2013.01); *F04B 19/22* (2013.01);
(Continued)

(58) Field of Classification Search
CPC .......... F04B 19/22; F04B 17/03; F04B 49/06; F04B 53/10; F04B 53/14; F04B 53/16; A47J 31/46; A47J 31/402
(Continued)

(56) References Cited

U.S. PATENT DOCUMENTS 5,392,694 A * 2/1995 Muller ................... A47J 31/36
99/295
5,778,671 A * 7/1998 Bloomquist .......... F15B 21/087
417/371

(Continued)

FOREIGN PATENT DOCUMENTS

EP    1205663 B1    5/2005
GB    2 454 908 A   5/2009
(Continued)

OTHER PUBLICATIONS

International Search Report for International Application No. PCT/IB2015/051899, dated Apr. 21, 2015.

*Primary Examiner* — Thien S Tran
(74) *Attorney, Agent, or Firm* — Heslin Rothenberg Farley & Mesiti P.C.; Victor A. Cardona, Esq.

(57) ABSTRACT

A machine for preparing liquid food products includes: a source of a liquid; a delivery assembly, having a brewing chamber for receiving a precursor of a liquid food product and for delivering the food product following passage of the liquid through the brewing chamber; a pump, for pumping the liquid; and a control system, for controlling an electric motor of the pump. The pump has a casing with an inlet and an outlet and an arrangement driven via the motor. The motor is bidirectional, and the control system includes means for controlling reversal of rotation of the motor between a primary direction and a secondary direction. The (Continued)

pump has a priming system including a recirculation valve and an actuation arrangement.

20 Claims, 10 Drawing Sheets

(51) Int. Cl.
- *F04B 17/03* (2006.01)
- *F04B 19/22* (2006.01)
- *F04B 49/06* (2006.01)
- *F04B 53/10* (2006.01)
- *F04B 53/14* (2006.01)
- *F04B 53/16* (2006.01)

(52) U.S. Cl.
CPC ............ *F04B 49/06* (2013.01); *F04B 49/065* (2013.01); *F04B 53/10* (2013.01); *F04B 53/14* (2013.01); *F04B 53/16* (2013.01); *F04B 2203/0201* (2013.01); *F04B 2203/0202* (2013.01); *F04B 2203/0209* (2013.01); *F04B 2205/04* (2013.01); *F04B 2205/09* (2013.01)

(58) Field of Classification Search
USPC ................ 99/289 R, 293, 295; 426/425, 431
See application file for complete search history.

(56) References Cited

U.S. PATENT DOCUMENTS

| | | | |
|---|---|---|---|
| 6,398,514 B1* | 6/2002 | Smith | F04B 9/025 |
| | | | 222/309 |
| 2011/0185717 A1* | 8/2011 | Kotsonis | F04B 1/28 |
| | | | 60/327 |
| 2013/0129885 A1* | 5/2013 | Doglioni Majer | A47J 31/002 |
| | | | 426/431 |

FOREIGN PATENT DOCUMENTS

| | | |
|---|---|---|
| WO | 2004/001871 A2 | 12/2003 |
| WO | 2012/168917 A1 | 12/2012 |
| WO | 2012/168918 A1 | 12/2012 |
| WO | 2013/038318 A1 | 3/2013 |
| WO | 2013/111088 A1 | 8/2013 |
| WO | 2013/140282 A1 | 9/2013 |
| WO | 2013/150480 A1 | 10/2013 |
| WO | 2013/182923 A1 | 12/2013 |

* cited by examiner

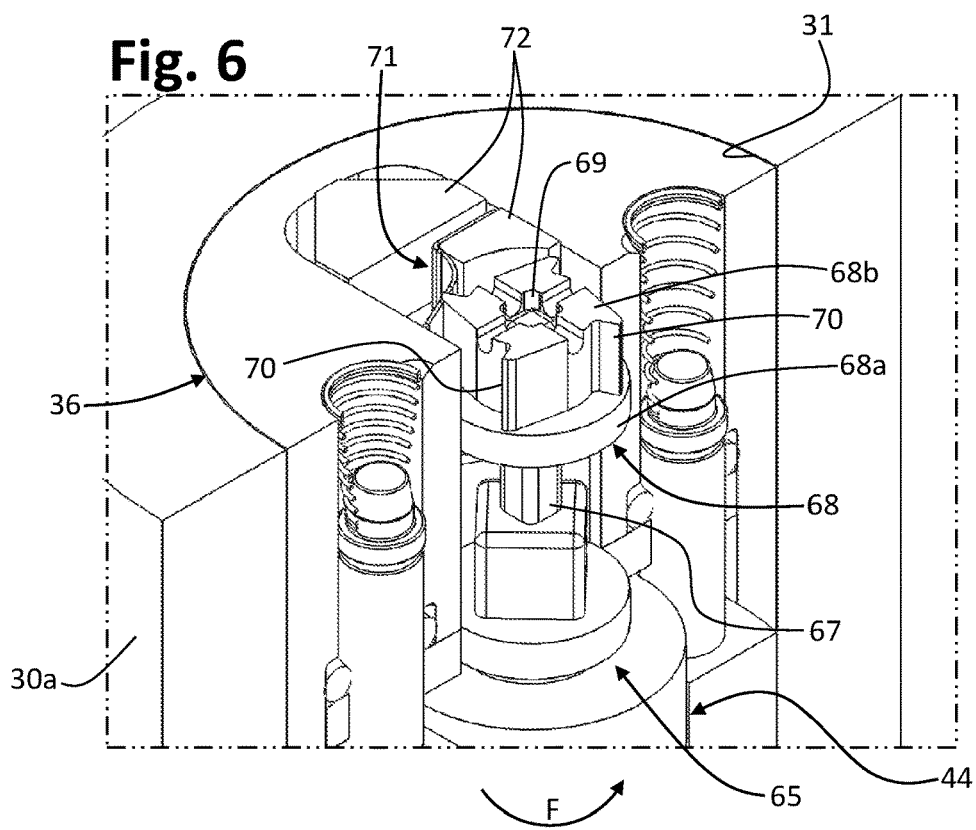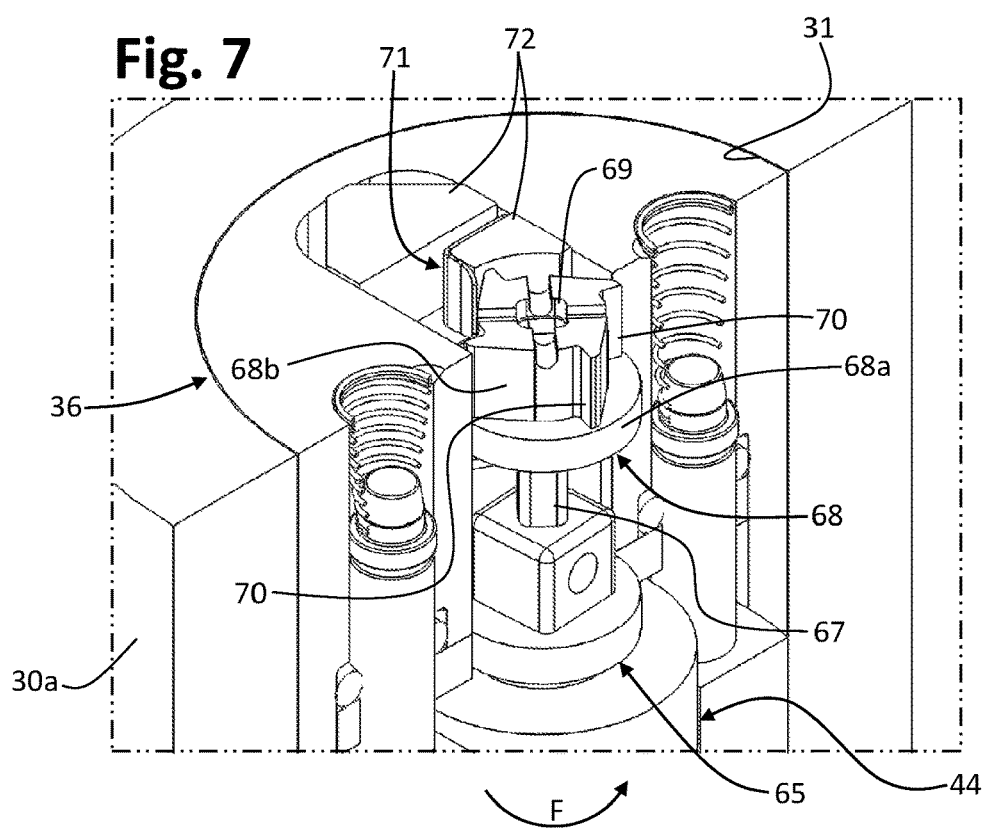

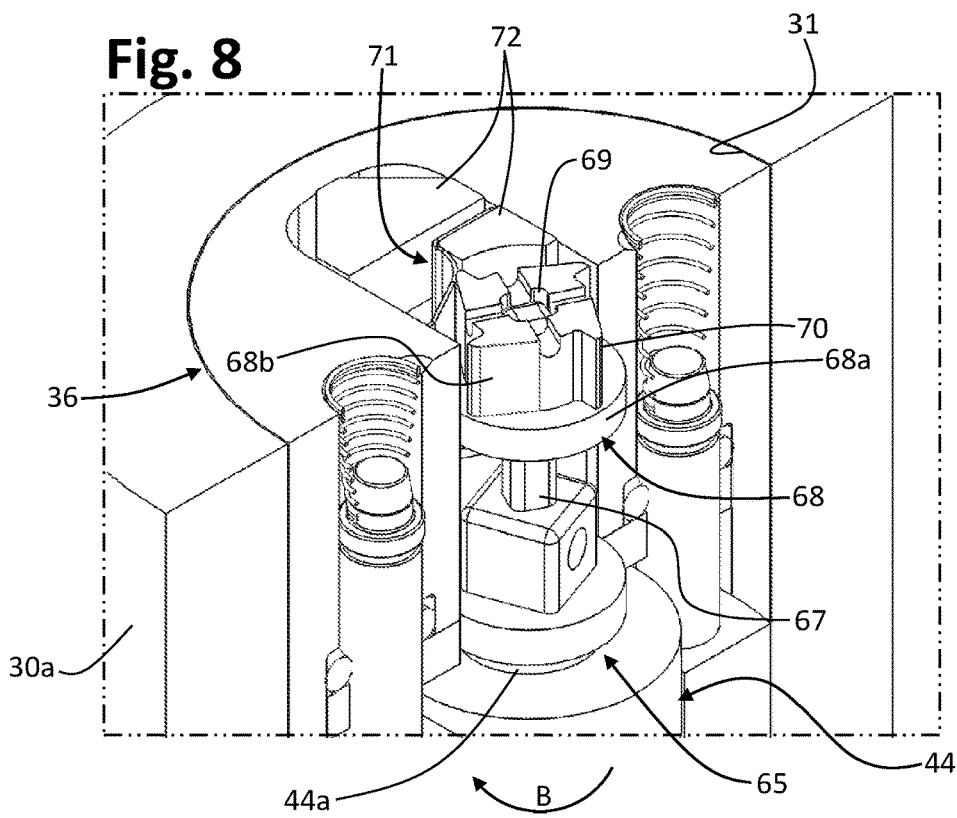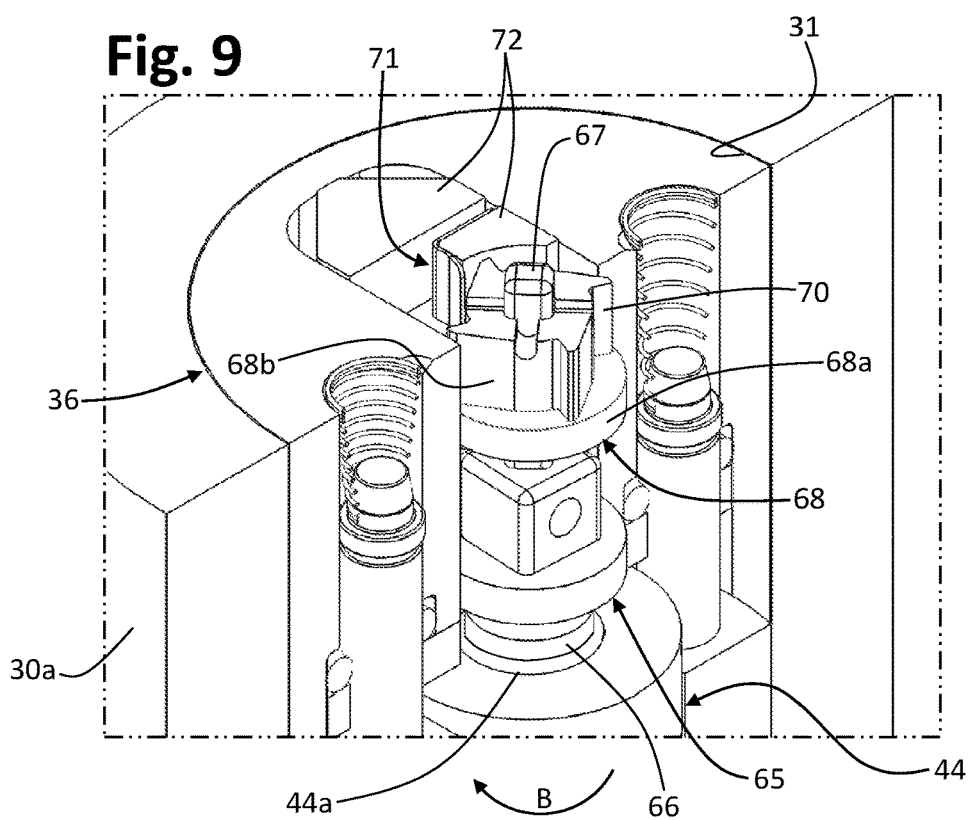

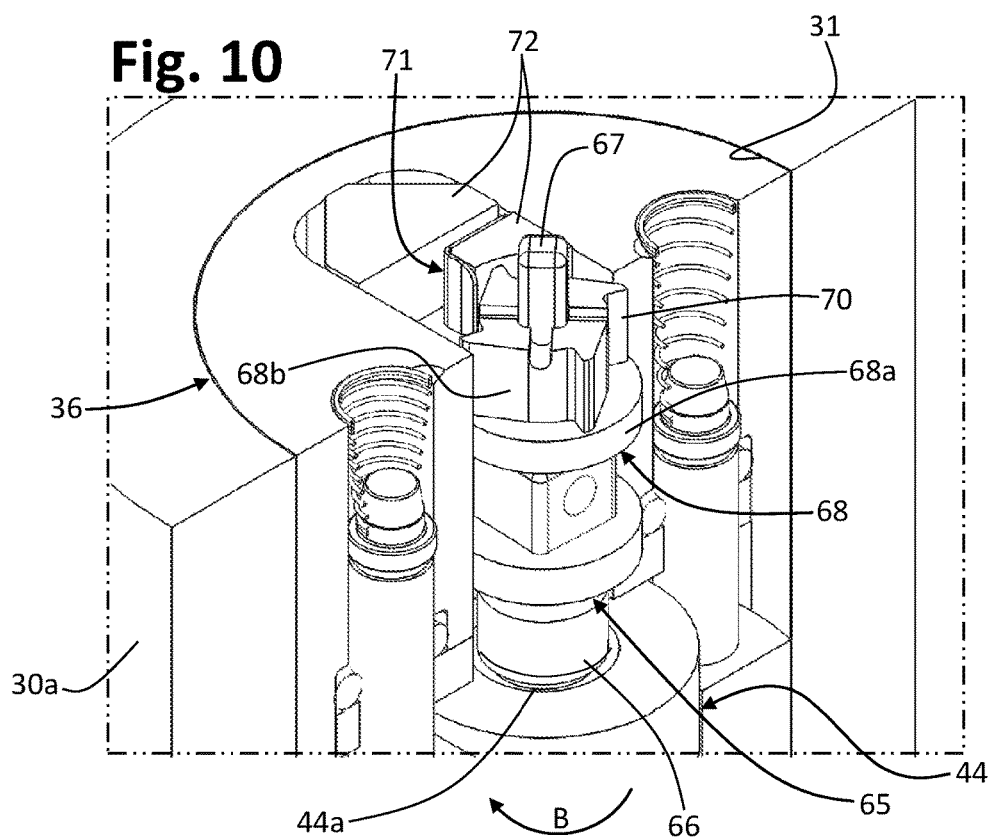

MACHINE FOR PREPARING LIQUID PRODUCTS, IN PARTICULAR VIA CAPSULES

CROSS REFERENCE TO RELATED APPLICATIONS

This application is a national stage filing under section 371 of International Application No. PCT/IB2015/051899, filed on Mar. 16, 2015, and published in English on Sep. 24, 2015, as WO 2015/140688 A1, and claims priority of Italian application No. TO2014A000227 filed on Mar. 19, 2014, the entire disclosure of these applications being hereby incorporated herein by reference.

FIELD OF THE INVENTION

The present invention relates to machines for preparing liquid food products in general, in particular liquid products that can be obtained via capsules.

PRIOR ART

Machines of the type referred to, typically machines for preparing coffee and soluble products, are usually provided with a pump, which can be driven for forcing water from a tank to an infusion chamber. Usually provided along the supply line between the tank and the infusion chamber are means for heating the water.

Pumps used in machines of this type are usually vibration pumps, the electric actuator of which is constituted by a solenoid. A pump of this type (see, for example, EP1205663 A1) has a body (usually made of plastic material) with a cavity having an inlet and an outlet, generally coaxial to one another. The cavity of the valve body includes a cylindrical chamber, axially aligned to the inlet. Slidably mounted in the cylindrical chamber is a piston made of ferromagnetic material, which is axially hollow and is urged by a spring towards a normal advanced position. The pump has an intake valve, with a valve seat defined substantially at the end of the cylindrical chamber opposite to the inlet, and an open/close element with a corresponding return spring. Provided in the position opposite to the intake valve is a delivery valve, constituted by a check valve. Mounted on the outside of the cylindrical chamber is a coil, with corresponding magnetic bushings and spacer.

In operation, the coil of the solenoid is supplied in a cyclic way to cause reciprocating movements of the piston. In particular, when the coil is supplied, the piston recedes against the action of the corresponding spring, thereby causing opening of the intake valve. The water at inlet to the pump flows into the piston and occupies a hollow space comprised between the intake valve and the delivery valve, which in this step is closed. Supply to the coil is then interrupted, with the piston that is urged by the corresponding spring towards the initial advanced position so as to close the intake valve again. Advance of the piston moreover causes compression of the water contained in the aforesaid hollow space, thereby causing opening of the delivery valve and consequent passage of water towards the outlet of the pump. Following upon a new supply of the coil, the piston recedes, as described above, thereby causing reclosing of the delivery valve and a new opening of the intake valve. The frequency of the cycles of supply of the coil is of course very high.

These pumps are the source of considerable vibrations during operation and noise. Another problem of this type of pumps is that the strokes in retraction and advance of the corresponding piston cannot be defined precisely in so far as they are obtained by a solenoid and a spring, respectively. Consequently, the stroke of the piston can vary in the presence of counterpressures. This also means that control of these pumps is generally complex—for example in terms of regulation of the delivery or pressure—and implies that the control system of the machine will have available feedback signals. For this reason, the machine must be equipped with complex and costly measuring sensors, such as volumetric sensors and pressure sensors.

From U.S. Pat. No. 5,392,694 A, on which the preamble of Claim 1 is based, there is also known a machine for preparing liquid products, comprising a pump with a piston and a pump casing having a cylindrical cavity, where the piston moves with reciprocating motion. The pump has an intake valve and a delivery valve, in fluid communication with the cylindrical cavity. The intake valve is opened when in the cylindrical chamber there exists a pressure below atmospheric pressure, determined by recession of the piston. Instead, the delivery valve opens when in the cylindrical chamber there exists a pressure above the delivery pressure, determined by advance of the piston. The reciprocating movement is produced by an electric motor with rotating shaft associated to which is a transmission arrangement of the crankshaft type. In particular, associated to the shaft of the motor is a wormscrew meshing with a gear wheel that causes rotation of an eccentric. Associated to the eccentric is the first end of a crank, the second end of which is, instead, associated to the piston. This solution presents the advantage that the advance and retraction strokes of the piston are defined precisely. The transmission arrangement is, however, cumbersome and relatively noisy.

Pumps used in machines for preparing liquid products of a known type are then generally subject to priming problems, due to the occasional presence of air within the body of the pump, with possible imprecise operation at startup.

AIM AND SUMMARY

In its general terms, the aim of the present invention is to provide a machine of the type referred to at the start having a pump in which possible priming problems are eliminated or at least considerably reduced. Another aim of the invention is to provide one such machine having a pump whose operation is distinguished by reduced vibrations and noise, as well as having a compact and simple structure from the constructional standpoint, but being functional and reliable. A further aim of the invention is to provide one such machine whose control system is able to control in a simple and inexpensive way some operating quantities of the corresponding pump.

According to the invention, at least one of the aforesaid aim is achieved thanks to a machine for preparing beverages and liquid products in general, which presents the characteristics recalled in Claim 1. Advantageous developments of the invention form the subject of the dependent claims. The claims form an integral part of the technical teaching provided herein in relation to the invention.

BRIEF DESCRIPTION OF THE DRAWINGS

Further objects, characteristics, and advantages of the invention will emerge clearly from the ensuing detailed description, with reference to the annexed drawings, which are provided purely by way of non-limiting example and in which:

FIGS. 6 and 7 are partial and schematic sectioned perspective views of the pump of FIGS. 2-5, in a first operating mode;

FIGS. 8, 9, and 10 are partial and schematic sectioned perspective views of the pump of FIGS. 2-5, in a second operating mode;

DESCRIPTION OF EMBODIMENTS OF THE INVENTION

In the ensuing description, various specific details are illustrated aimed at providing an in-depth understanding of the embodiments. The embodiments may be provided without one or more of the specific details, or with other methods, components, materials, etc. In other cases, structures, materials or operations that are evident for the person skilled in the sector are not shown or described in detail so that the various aspects of the embodiments will not be obscured. Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in various points of the present description do not necessarily refer to one and the same embodiment. Furthermore, particular conformations, structures, or characteristics may be combined in any adequate way in one or more embodiments. The references used herein are provided merely for convenience and hence do not define the sphere of protection or the scope of the embodiments.

Figure 1:
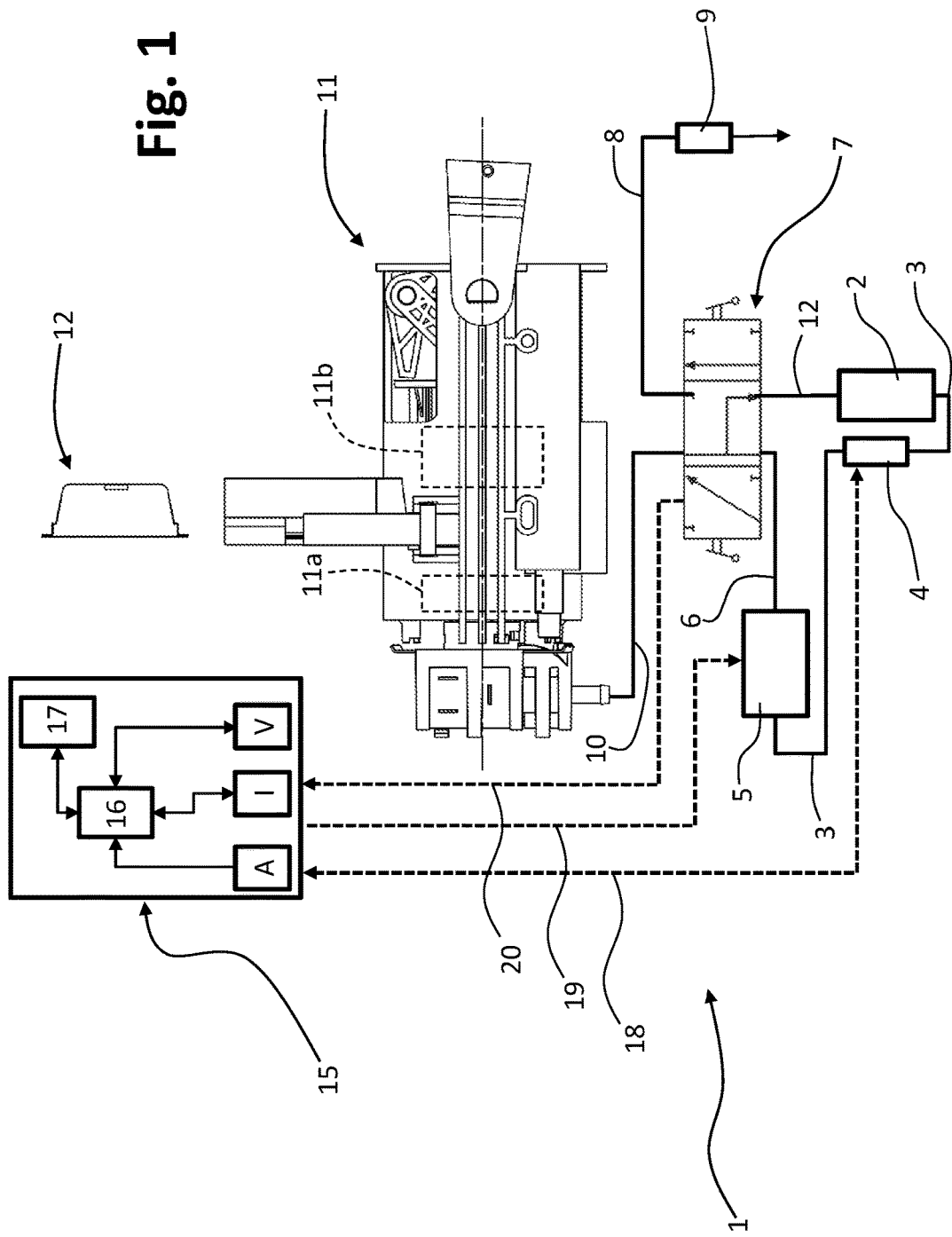
FIG. 1 is a schematic representation of a possible embodiment of a machine for preparing liquid products according to the invention.

Represented schematically in FIG. 1 is a machine for preparing liquid products according to a possible embodiment of the invention.

The machine, designated as a whole by 1, comprises a source 2 of a liquid, which here is assumed as being a tank for cold water. The tank 2 has an outlet duct 3 on which a pump 4 is operative. Provided on the duct 3, preferably but not necessarily downstream of the pump 4, is a water-heating element, for example a boiler 5, of a type in itself known. In the example represented, an outlet of the boiler 5 is connected to a duct 6 for supply of hot water and/or pressurized steam to an inlet of a distributor device, for example a slide distributor, designated by 7. When the distributor 7 is in a first operating position (to the left, as viewed in FIG. 1), it sets the duct 6 in communication with a duct 8 that supplies the nozzle 9 of an external nozzle for delivery of hot water and/or steam; when, instead, the distributor 7 is in a second operating position (to the right, as viewed in FIG. 1), the duct 6 is set in fluid communication with a duct 10 for supply of pressurized hot water to a delivery assembly 11. Finally, when the distributor 7 is in an inoperative position (at the centre, as viewed in FIG. 1), the duct 6 is in fluid communication with a duct 12 for return of water into the tank 2.

The scheme of FIG. 1 is merely an example, with the distributor 7 that may be motor-driven or replaced by suitable connectors and electrical valve means that can be governed by the control system of the machine 1, for example in the case of machines that are not provided with the nozzle 9. In the case of a manually operated distributor, preferentially associated thereto are electrical sensor means (for example, one or more microswitches) for detecting the position assumed by the distributor.

In general terms, the assembly 11 has a supporting structure present inside which is a first part 11a and a second part 11b of a brewing or infusion chamber, of which at least one part is movable with respect to the other. The aforesaid parts may comprise, for example, a cup-shaped body or capsule holder and an injector. The assembly 11 then has a system for insertion of a capsule 12 into the assembly. Connected to a part of the brewing chamber is the duct 10, whereas the other part has an outlet for delivery of the beverage or other liquid product that can be obtained with the capsule 12. As per the known technique, the water and/or steam is forced by the pump 4 into the brewing chamber 11a-11b so as to pass through the capsule 12 and thereby produce the liquid product that is delivered by the machine 1 (in the case of sealed capsules, the parts 11a and 11b of the brewing chamber may also be provided with perforation tips or the like).

The delivery assembly 11 may be of any one type known in the field, for example as described in one or more from among WO 2013/182923 A1, WO 2013/150480 A1, WO 2013/140282 A1, WO 2013/111088 A1, WO 2013/038318 A1, WO 2012/168917 A1, WO2012168918 A1 filed in the name of the present applicant, to which the reader is referred also in relation to a description of possible types of cartridges (whether sealed or not) that can be used in machines according to the present invention. It should on the other hand be noted that the invention may also be applied to machines that use pods made of paper material and in machines the brewing chamber of which is devised for receiving directly the precursor of the liquid product without mediation of a capsule or pod, such as a granular or powdered preparation, for example ground coffee.

FIG. 1 also highlights in an extremely schematic way the control system of the machine 1, comprising a control unit 15 including processing means, such as, for example, a microcontroller 16, and nonvolatile memory means 17, encoded in which are instructions for operation of the machine, for example in the form of one or more operating programs.

The control unit 15, and specifically the microcontroller 16, is pre-arranged for controlling the heating means of the machine 1, here represented by an electric resistance of the boiler 5, as well as the pump 4, for implementing one or more possible operating modes of the machine.

In the example, the dashed arrows 18 and 19 indicate by way of example control lines from the unit 15 to the pump 4 and to the boiler 5, respectively. The dashed arrow 20 indicates by way of example a possible control line between the sensor means associated to the distributor 7 and the unit 15 so that this will know the operating position manually imparted on the distributor (as has been said, in the case of automatic operation, it may be the unit 15 that controls positioning of such a distributor or the operating condition of valve means that substitute it). As already emphasized, the scheme provided here has merely the purpose of highlighting in an intuitive way the functional connection between the various parts of interest, it being possible for the hydraulic and circuit layouts of the machine forming subject of the invention to be variously configured according to the need.

Figure 2:
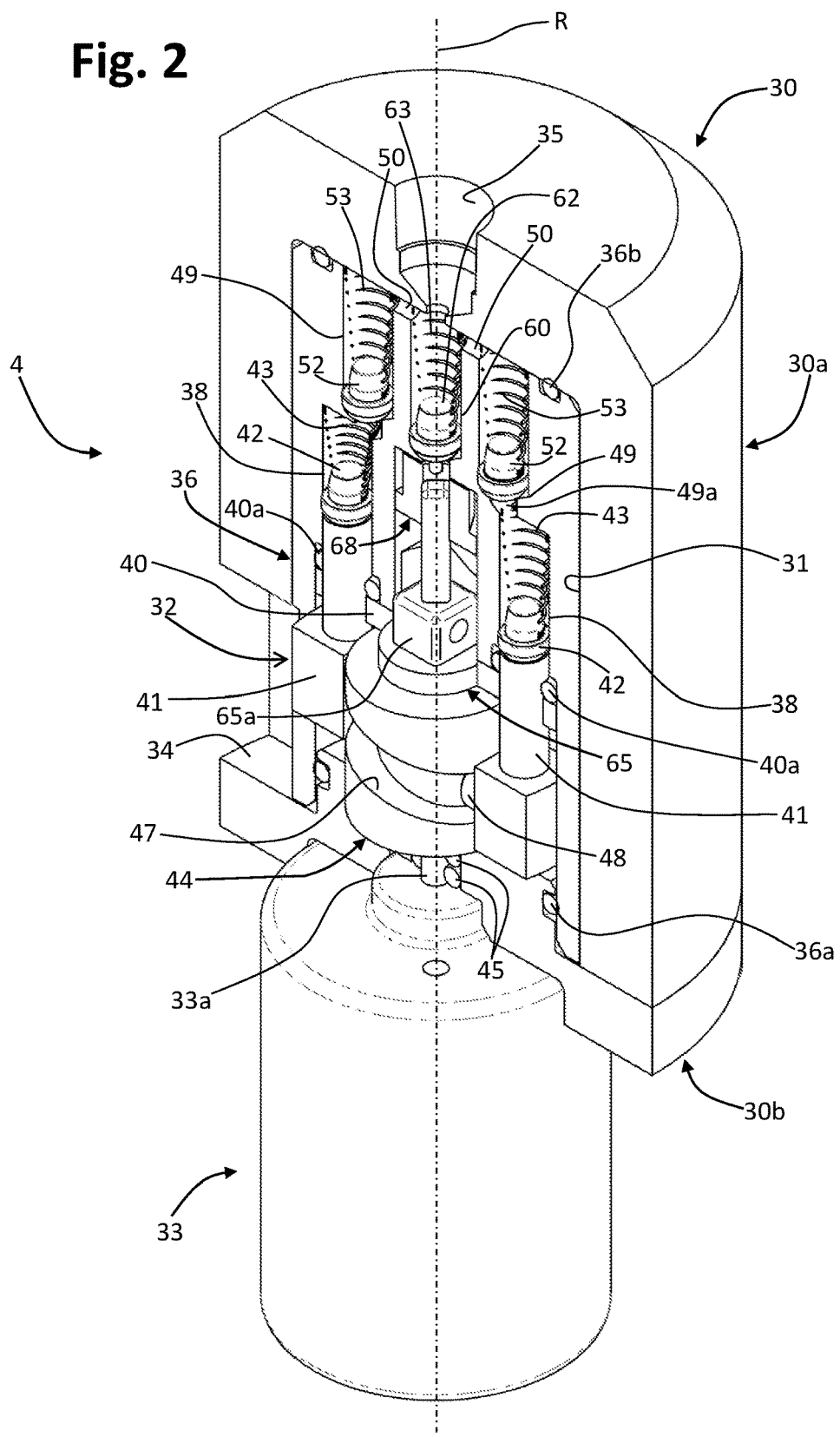
FIG. 2 is a sectioned perspective view of a pump of a machine according to a possible embodiment of the invention.

FIG. 2 is a schematic illustration of the pump of a machine according to the invention, designated as a whole by the reference 4. The pump 4 comprises a casing 30, here formed by a cup-shaped body 30*a* and by a lid 30*b*, coupled together in a fluid-tight way. In a preferred embodiment, the casing 30 and/or the parts that make it up are made of plastic material, in particular an injection-mouldable thermoplastic material.

The casing 30 defines a cavity 31, located within which is a pumping arrangement, designated as a whole by 32, which can be driven via an electric actuator 33. The casing 30, i.e., its fluid-tight cavity 31, has an intake inlet 34 (see also FIGS. 3-6) and a delivery outlet 35.

In a preferred embodiment, such as the one exemplified here, the outlet 35 is defined at an axial end of the casing 30, whereas the inlet 34 is in a lateral position of the casing. In one such embodiment, the actuator 33 is preferably located at the other axial end of the casing 30, thereby making it possible to obtain a compact configuration of the pump 4 as a whole. For this purpose, the lid 30*b* may also be shaped so as to define a positioning seat for a front of the actuator 33, as in the case exemplified.

The electric actuator 33 of the pump 4 is a motor, having a rotating shaft 33*a* projecting from the casing of the motor. In a preferred embodiment of the invention the motor 33 is a d.c. motor, of a conception in itself known. On the other hand, electric motors with rotating shaft of some other type, such as for example brushless motors, stepper motors, or a.c. motors are not excluded from the scope of the invention.

In a preferred embodiment of the invention, the pumping arrangement 32 comprises a piston-holder assembly or block 36. In the example shown the block 36 comprises a substantially cylindrical stationary body, for example made of a single piece of plastic material, in particular a thermoplastic material. The block 36 is mounted in a fluid-tight way within the cavity 31, preferably via axial seals and radial seals. For this purpose, in the example, a radial O-ring 36*a* is provided operative between an inner peripheral surface of the block 36 and the peripheral surface of a central projection of the lower lid 30*b*, as well as an axial O-ring 36*b* operative between facing end surfaces of the block 36 and of the body 30*a*, with the outlet 35 that is located in the area circumscribed by the O-ring 36*b*. As may be clearly seen, for example, in FIG. 3, defined in the peripheral wall of the block 36 is a passage 37 for setting the inside of the block itself in fluid communication with the inlet 34 of the cavity 31.

Figure 3:
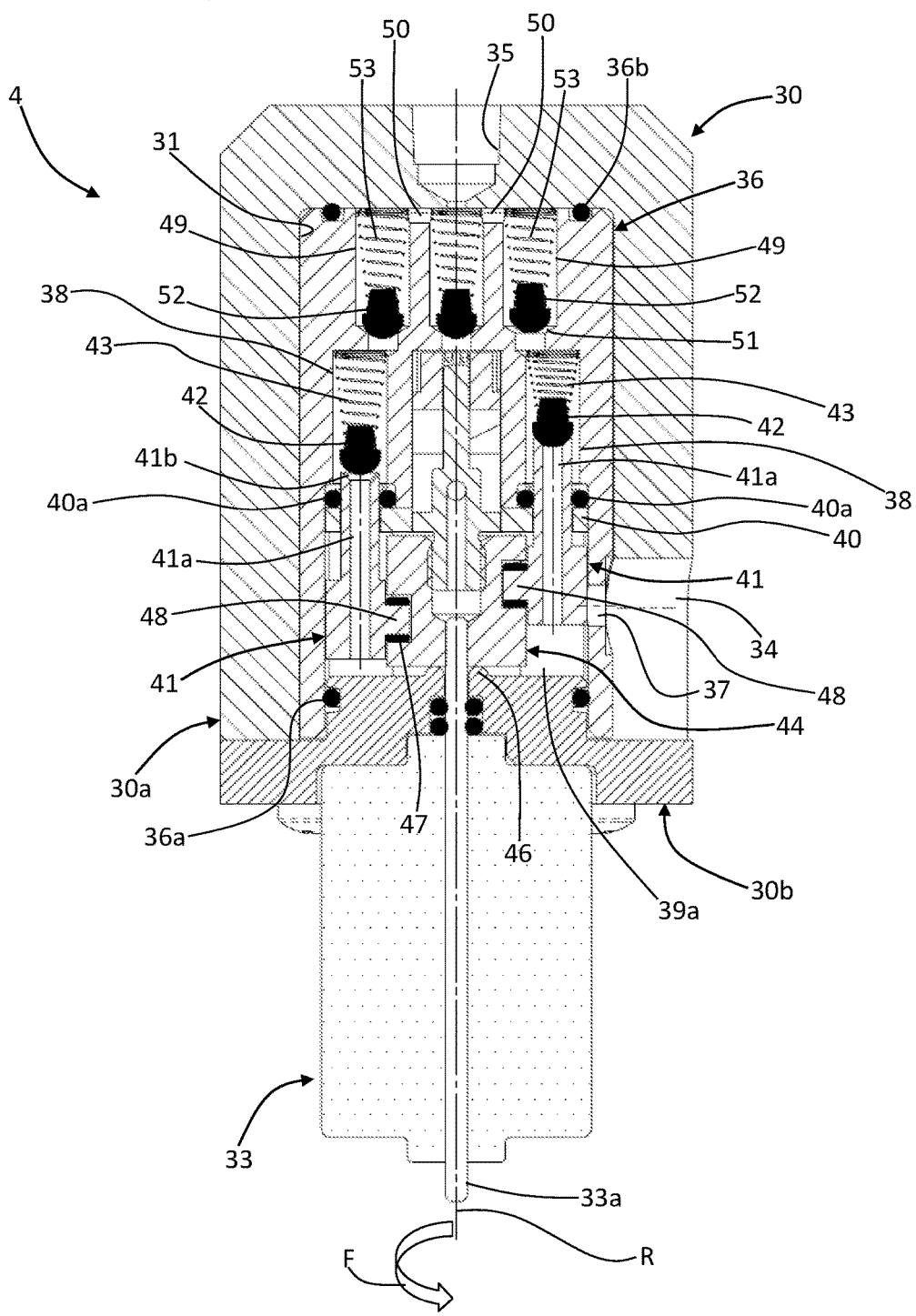
FIGS. 3 and 4 are schematic cross sections of the pump of FIG. 2, in two different operating conditions.

Defined in the piston-holder block 36 are one or more chambers or cylinders. In the example, two cylinders 38 are defined that extend in an axial direction of the block 36, in positions generally parallel to one another and with respect to the axis of rotation R of the shaft 33*a* of the motor 33. With reference also to FIG. 3, underneath the cylinders 38 a portion 39*a* of a cavity of the block 36 is defined, housed in which is a plate 40, stationary with respect to the block 36, which is mounted at the base of the cylinders 38 and defines through holes (not represented), each axially aligned to a respective cylinder. Mounted through the aforesaid holes of the plate 40 are cylindrical portions of respective pistons 41, preferably made of plastic material, such as a thermoplastic material. Each piston 41 extends at least in part within the corresponding cylinder 38 so as to define a variable-volume working chamber. Preferably, defined at the proximal end of the cylinders 38 and in the holes of the plate 40 are positioning seats for respective guide and seal bushings 40*a* of the pistons 41. Also the plate 40 may be made of plastic material.

In a preferred embodiment, such as the one exemplified, provided within the cylinders 38 are valve means, which are able to interact with the pistons 41 in order to provide pumping of the liquid.

In one embodiment, such as the one shown, the pistons 41 have an axial cavity 41*a* and define, at their upper end, a valve seat 41*b*, bearing upon which is a respective open/close element 42. The open/close element 42, for example made of rubber, is axially aligned to the piston 41 and supported by the first end of a helical spring 43, the opposite end of which is constrained, for example by mechanical interference, at the distal end of the corresponding cylinder 38. As will emerge clearly hereinafter, the valves 43-43 are intake valves.

Designated by 44 is an actuation member, made, for example, of plastic material, driven in rotation by the shaft 33*a* of the motor 30, which in particular is rotatable about the axis R. The member 44 is housed in the lower cavity 39*a* of the block 36 and is fitted to the shaft 33*a*, which passes through a corresponding hole of the lid 30*b*, operatively associated to which are seal means. In the example illustrated, the lid 30*b* defines, in a position peripheral with respect to a stretch of the aforesaid hole, a seat for housing two radial O-rings 45, which co-operate with the shaft 33*a* to prevent leakage of water towards the motor 33. Preferably, moreover, the upper surface of the lid 30*b* defines an annular relief 46 (FIG. 3) that circumscribes the upper end of the hole for passage of the shaft 33*a*. The actuation member 44 rests at the bottom on the relief 46 in order to minimize the surface of contact between the member itself and the upper surface of the lid 30*b*.

In respective proximal-end regions, the pistons 41 are coupled to the actuation member 44 in such a way that rotation of the latter will determine reciprocating axial displacements of each piston 41 in the respective cylinder 38, with a pre-set stroke, between a position of maximum advance and a position of maximum retraction with respect to the distal end of the cylinder itself, and thereby vary the volume of the corresponding working chamber. In a preferred embodiment, the actuation member 44 defines a cam path 47, with which each piston 41 co-operates via a corresponding cam-follower 48. The cam path 47 is generally inclined with respect to the axis of rotation R so as to determine the reciprocating axial displacements of the pistons 41. In the case exemplified, the movement of the pistons 41 is substantially sinusoidal, and coupling between the cam and the cam-follower is such that to the position of maximum advance of one piston 41 there corresponds the position of maximum retraction of the other piston 41. In the specific case illustrated, corresponding to a complete rotation of the member 44 are two complete reciprocating displacements of each piston 41.

In a particularly advantageous embodiment, the actuation member 44 comprises a drum cam, i.e., a substantially cylindrical body, defined on the peripheral surface of which is the cam path 47, here obtained via an annular groove inclined with respect to the axis of rotation R, in which the cam-followers 47 are engaged. In the example, the cam-followers 47 are configured as elements that project laterally from the base of the pistons, which are preferably generally cylindrical, and are engaged in the groove that defines the cam path. In what follows, for simplicity, the member 44 will be referred to as "cam".

Each cylinder 38 of the block 36 is connected in fluid communication with the delivery outlet 35 by way of a respective check or non return valve, which functions as delivery valve. As will emerge hereinafter, such a check valve is able to assume an opening position during passage of the corresponding piston 41 from the position of maximum retraction to the position of maximum advance.

In one embodiment, provided in the part of the block 36 opposite to the cam 44 are valve housings in a number corresponding to that of the cylinders 38. In the embodiment illustrated, two housings 49 are hence provided, which are preferably cylindrical, which open at the end face of the block 36 opposite to the cavity 39a and extend axially towards the cylinders 38, in a position preferably parallel thereto. Each housing 49 is in fluid communication with a cylinder 38 via a port at its own proximal end (one of these ports is represented only in FIG. 2 and designated by 49a). The distal end of the housings 49 is, instead, in fluid communication with the outlet 35 of the valve casing 30, here through a radiusing passage 50 that is defined between the facing surfaces of the block 36 and of the axial end of the casing body 30a, in the area circumscribed by the O-ring 36b.

Defined in the proximal-end region of each housing 49 is a valve seat 51 (FIG. 3), on which an open/close element 52, for example made of rubber, is urged by a corresponding helical spring 53. The end of the spring 53 opposite to the corresponding open/close element 52 here rests on the inner surface of the axial end of the casing body 30a. As may be noted, hence, in the delivery valves exemplified, the open/close elements 52 are held by the springs 53 in a normal closing position of the corresponding valve seats 51 provided on the pistons.

During normal operation of the pump 4, the motor 33 is driven to cause rotation of the cam 44. Preferably, the motor 33 is actuated in a primary or predefined direction of rotation, which here will be assumed as being a clockwise direction of rotation, indicated by the arrow F in the lower part of FIG. 3. The lower cavity 39a of the block 36 provides a draught area of the pump 4. Given the presence of the inlet 34 and of the passage 34 connected to the tank, in fact, the cavity 39a is at least partially filled with water at the tank pressure.

Figure 4:
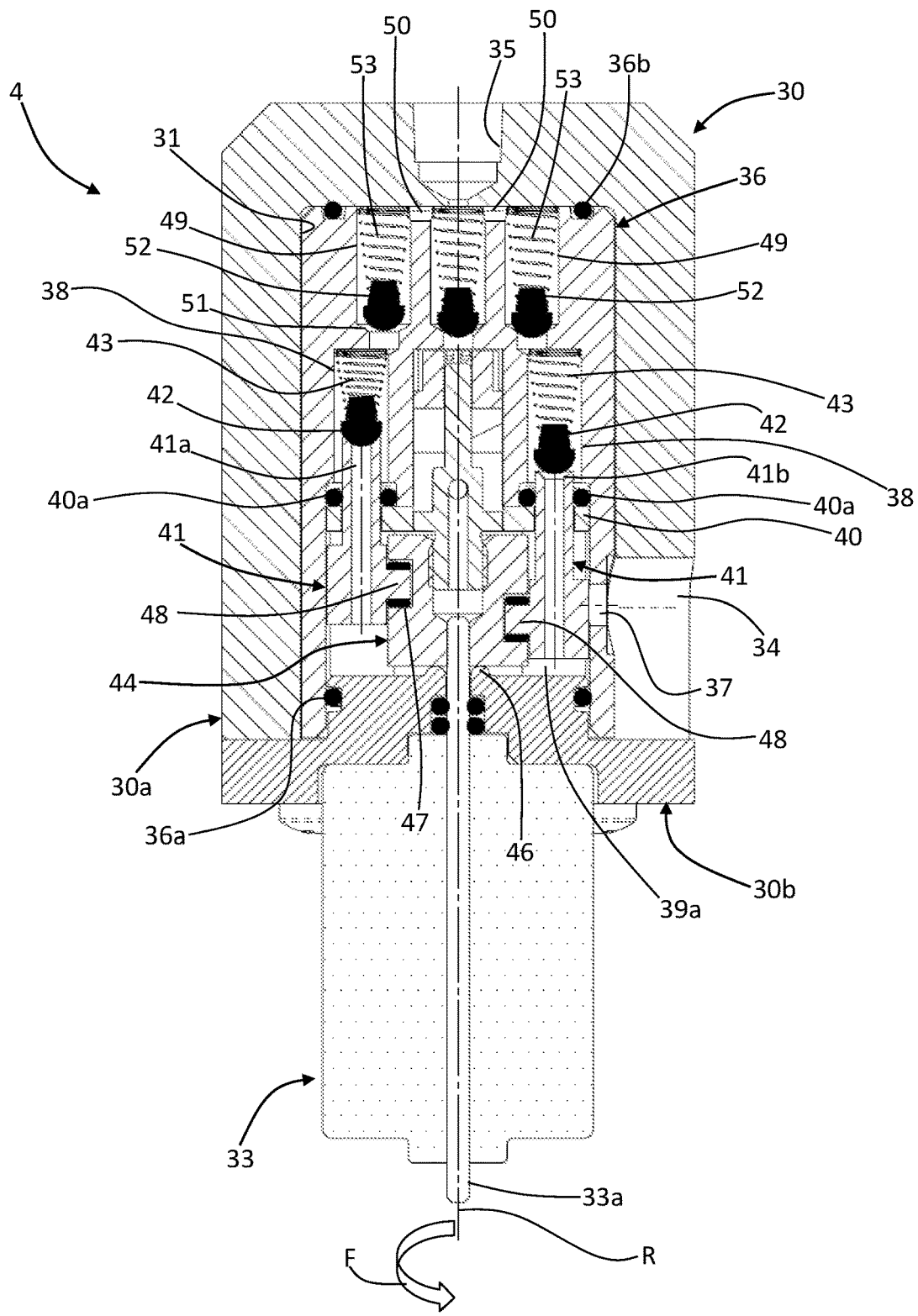

Rotation of the cam 44 causes the reciprocating movements of the pistons 41, as described previously, with one piston that advances and the other that recedes. FIG. 3 illustrates the conditions of maximum advance and maximum retraction of the right-hand piston 41 and of the left-hand piston 41, respectively, whereas FIG. 4 illustrates the reverse condition.

With reference, for example, to the right-hand piston 41, in the position of maximum advance (FIG. 3) its cavity 41a is occluded by the open/close element 42 of the corresponding intake valve, in a condition of maximum compression of the spring 43. As the piston 41 recedes, the spring 43 progressively expands, temporarily maintaining the open/close element 42 still in the condition of closing of the cavity 41a of the piston. Retraction of the piston causes an increase of the volume of the variable-volume chamber of the corresponding cylinder 38. The fluid inside it reduces its pressure down to a value lower than the intake pressure, and the force due to the difference of pressure causes opening of the intake valve, i.e., detachment between the open/close element 42 and the corresponding valve seat 41b on the piston, thereby obtaining opening of the axial cavity 41a (the spring 42 is of course calibrated for this purpose). The piston 41 next reaches (FIG. 4) the position of maximum retraction, in the draught area given by the cavity portion 39a. In this step, the delivery valve 52-53 is in the closing position. Simultaneously, a reverse sequence of movement is provided for the left-hand piston 41.

As may be appreciated, in the course of retraction of one piston 41 there is determined an increase of the useful volume of the cylinder 38, i.e., of the respective working chamber, with a passage of water from the cavity portion 39a to the cylinder itself through the hollow piston 41, when the corresponding open/close element 42 is in an opening condition. Instead, in the course of the subsequent advance of the same piston, the volume of the working chamber decreases, with the water contained therein that, at least after passage of the open/close element 42 into the condition of closing of the cavity 41a of the piston, undergoes a compression. This causes opening of the delivery valve 52-53, i.e., a recession of its open/close element countering the action of the corresponding spring. The open/close element 52 then releases the corresponding valve seat 51, thereby enabling passage of the water from the cylinder 38 to the housing 49 and then, via the connection passage 50, to the delivery outlet 35. Subsequent retraction of the piston 41 within the cylinder 38 then enables reclosing of the delivery valve 52-53 by virtue of the action of the corresponding spring.

Via the displacement cycle described, which takes place in a reciprocating way for all the pistons provided, the water is forced from the inlet 34 to the outlet 35 of the pump 4.

The pump 4 described has a very compact structure, in any case making it possible to obtain adequate pressures and flowrates for the application described herein. A substantial advantage of the machine according to the invention is represented by the fact that use of an electric motor for the pump, instead of a solenoid, enables increase of the possibilities of control of the pump and reduction of the number of components of the machine. Use of the motor 33 enables drastic reduction of the vibrations and noise of operation as compared to pumps traditionally used on machines for preparing beverages.

As mentioned, in a preferred embodiment the motor of the pump 33 is a d.c. motor, preferably with permanent magnets (or with collector). Motors of this type have a very low cost, are reliable, and are simple to control.

In one embodiment, the control unit 15 has means, designated as a whole by A in FIG. 1, for measuring the current absorbed by the motor 33. The measuring means 18 may comprise, for example, an ammeter integrated in an electronic board of the control unit 15. On the other hand, use of other types of sensors or amperometric transducers is not excluded from the scope of invention.

In one embodiment, the control unit 15 is configured for deducing the pressure at the outlet 35 of the pump 4 on the basis of the value of current absorbed by the motor 33, detected via the means 18. In this way, the control logic is perfectly able to compute autonomously the pressure value, thereby preventing the need to equip the machine 1 with a purposely provided pressure sensor. For this purpose, for example, in the memory means 17 associated to the microcontroller 16 information is encoded, for example in a tabular form, that the control unit 15 uses for the purposes of calculation of the pressure value, for each detected value of current absorbed.

In one embodiment, the control unit 15 is pre-arranged for computing the number of revolutions (r.p.m.) of the motor 33. It will be appreciated that, if the voltage-current characteristic curve of a d.c. motor is known, is extremely easy to derive the corresponding number of revolutions. For this purpose, as has been said, the value of current absorbed by the motor 33 can be obtained by the control unit via the means A designed for this purpose. On the other hand, the value of the supply voltage, or the armature voltage, of the motor 33 may be a parameter set and hence known to the control unit 15. There is nothing, however, to prevent providing means, shown schematically and designated by V in FIG. 1, for varying the supply or armature voltage of the motor 33, and thereby varying its speed. In either case, the aforesaid voltage value is known to the unit 15, which is thus able to compute the number of revolutions of the motor, without the need for a specific sensor. For this purpose, encoded in the memory means 17 is information representing the voltage-current characteristic curve of the motor.

In one embodiment, the control unit 15 is pre-arranged for computing the flow rate of the pump 4, on the basis of the rotational speed (r.p.m.) of the corresponding motor 33. It will be appreciated that the amount of liquid transported by the pump 4 varies in proportion to the speed of displacement of the pistons 41 and hence, in ultimate analysis, to the speed of the motor 33. Also for such a calculation, in the memory means 17 information is encoded—for example, obtained on an experimental basis—that expresses the relation existing between the speed of the motor 33 and the flow rate of the pump 4. On the basis of this information and the r.p.m. information, obtained in the way described previously, the control unit 15 is able to compute the value of flow rate of the pump 4. In this way, it is not necessary to equip the machine 1 with a purposely provided flowrate or volumetric sensor. Of course, on the same basis, it is also possible to control precisely the delivery of the pump 4 by varying the speed of the motor 33.

In a possible embodiment, the control system is provided both with means A for measuring the current absorbed by the motor 33 and with means V for varying the supply voltage thereof. In such an embodiment, the control unit 15 may be pre-arranged for varying the supply voltage (and hence the speed) as a function of the current absorbed by the motor 33 in order to guarantee a constant pressure. The information necessary for this purpose is also in this case encoded in the memory means 17.

In one embodiment, the motor 33 of the pump 4 is a bidirectional motor; i.e., it can be driven in opposite directions, without jeopardizing the operation described. For example, in the preferred case of use of a d.c. motor, reversal of rotation may be obtained by reversing the armature voltage or the excitation voltage, with the control system 15 pre-arranged with purposely provided reversal means, designated by I in FIG. 1.

In an embodiment of the invention, the pump 4 has a priming system, comprising a recirculation valve, which can be driven via a corresponding actuation arrangement to bring the delivery pressure of the pump 4 to the atmospheric pressure. For this purpose, in a particularly advantageous embodiment, the actuation arrangement is pre-arranged for causing opening of the recirculation valve following upon rotation of the shaft of the motor in a secondary direction, i.e., a direction opposite to that of normal actuation (previously defined as primary or predefined direction and assumed as being a clockwise direction of rotation).

Figure 5:
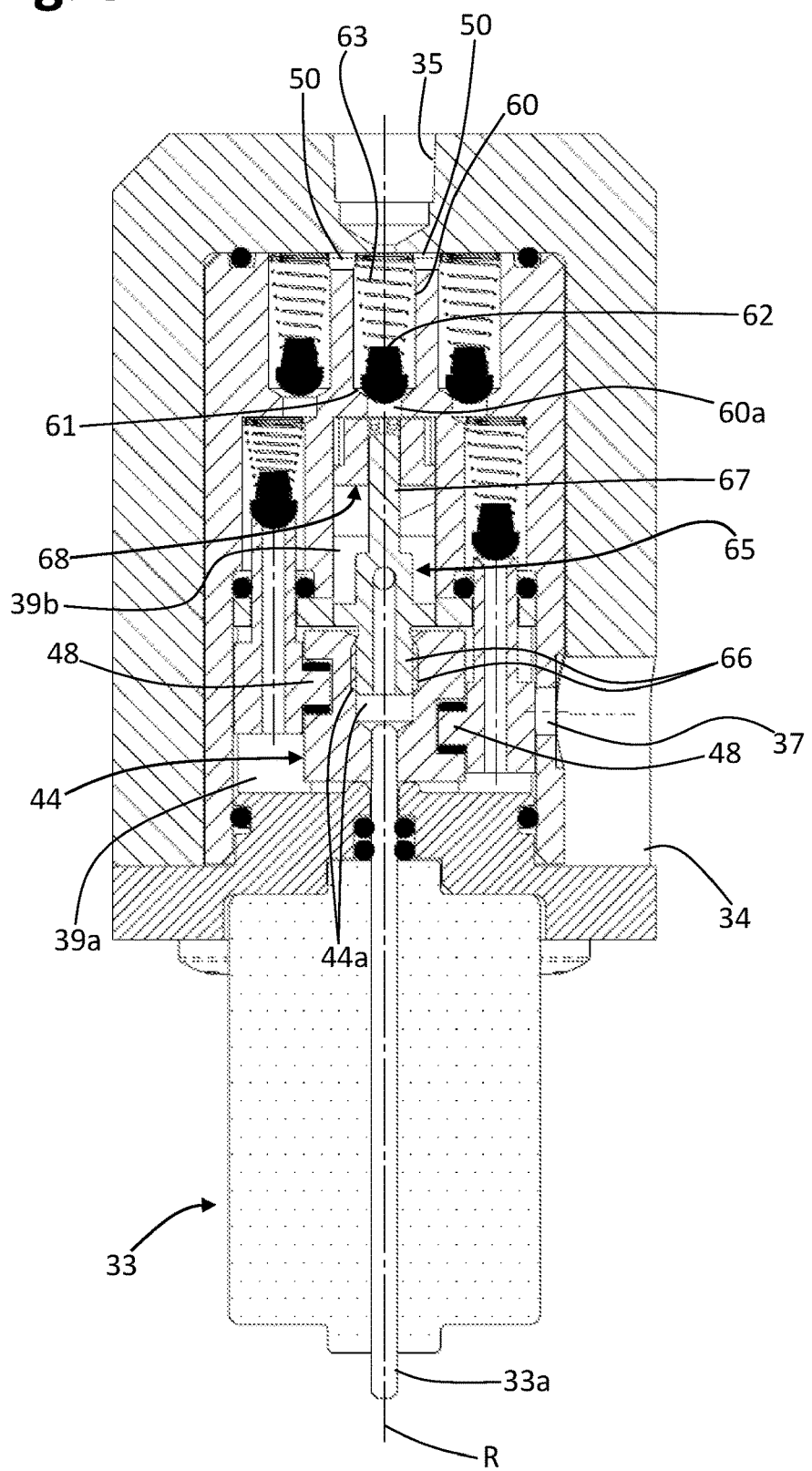
FIG. 5 is a view similar to that of FIG. 4, where some components of a priming system of the pump are represented.

With reference to FIG. 5, in one embodiment, provided in the part of the block 36 opposite to the cam 44 is a housing 60 for the aforesaid recirculation valve, here in a position substantially coaxial to the cam 44, i.e., to the axis of rotation R. It should be noted that FIG. 5 is similar to FIG. 4, but designated therein with a reference number are just the components useful for an understanding of the operation of the priming system referred to.

The housing 60 is built in a way similar to that of the housings 49 of FIGS. 3 and 4, with a corresponding lower port 60a having a preferably circular cross section, which in this case communicates with an upper portion 39b of the cavity internal to the piston-holder block, this upper cavity portion being in an intermediate position with respect to the cylinders 38. Defined in the lower region of the housing 60 is a valve seat 61, whereas its upper end communicates with the connection passage 50, i.e., with the outlet 35. The recirculation valve within the housing 60 is of a conception similar to the delivery valves, with a corresponding open/close element 62 urged by a corresponding spring 63 into a position of normal closing of the valve seat 61.

With reference also to FIGS. 6 to 10, the actuation arrangement of the recirculation valve 62-63 comprises a first lower rotating member, designated as a whole by 65, for example made of plastic, referred to hereinafter for simplicity as "pin". The pin 65 has a lower part 66 (see, for example, FIGS. 5 and 10) that can be constrained to the body of the cam 44 via an external-thread/internal-thread coupling. In the example, the aforesaid part is cylindrical and externally threaded, thus providing an external thread 66. On the other side, the cam 44 has at the centre a threaded cylindrical seat, which provides an internal thread 44a. Obviously, an opposite arrangement of the external thread and internal thread on the components in question is possible, even though this will bring about an increase in their overall dimensions. The pin 65 then has a generally stud-shaped upper part 67, for actuation of the recirculation valve 62-63.

The actuation arrangement then includes an upper rotating member, designated as a whole by 68, which is also made, for example, of plastic and is defined hereinafter for simplicity as "arrest". The arrest 68 is mounted in the upper cavity portion 39b above the part 66 of the pin 65 so as to be able to turn about the axis R, but is constrained axially, for example by way of suitable supports or spacers of a conception in itself known, which extend into the cavity portion 39b, and preferably also have the purpose of guaranteeing coaxiality between the components 44, 65 and 68 (in FIGS. 6-10 such a support or guide is partially visible and designated by 72).

The arrest 68 has an axial passage 69 (FIGS. 6-8), in which the stem 67 of the pin 35 is engaged via a prismatic coupling. In other words, the coupling between the stem 67 and the passage 36 is such that axial translations of the stem 67 in the passage 69 are enabled, but any rotation of the former in the latter are prevented. In the example, for this purpose, the stem 67 has a cross section with a non-circular geometry, in particular quadrangular, and at least one stretch of the passage 69 has a corresponding complementary shape.

The actuation arrangement of the recirculation valve 62-63 includes at least one anti-rotation system, or a ratchet mechanism, configured for enabling rotation of the arrest 68 in the preferential direction F of the motor, here the clockwise direction, and countering or preventing rotation thereof in the opposite direction. In the example illustrated in FIGS. 6-10, the arrest 68 has a part 68a with a circular profile in order to guide rotation, and a part 68b, the peripheral profile of which defines a plurality of teeth 70. The ratchet mechanism moreover comprises an element 71 elastically urged against the outer profile of the part 68a. In the example, this element 71 is constituted by a lamina, preferably a metal lamina, with a fixing portion held in position by the support designated by 72 and with the opposite portion, here defined as "arrest portion", that presses elastically on the outside of the toothed part of the arrest 68 in a substantially radial direction. The profile of the arrest 68 and the corresponding portion of the lamina 71 are shaped in such a way that the clockwise rotation of the arrest can take place freely, with the teeth 70 that slide underneath the arrest portion of the lamina 71, whilst the counterclockwise rotation is prevented following upon engagement of a tooth with the arrest portion of the lamina. With reference to FIGS. 6-7, in the steps of operation of the pump the lower external thread 66 of the pin 65 is screwed completely into the internal thread 44a defined in the cam 44. Rotation of the shaft 33a of the motor 33 in the clockwise direction F causes rotation of the cam 44, which actuates the pistons 41. The pin 65 is fixed in rotation with respect to the cam 44, and hence, by virtue of the prismatic coupling between the stem 67 and the arrest 68, also the latter is free to turn given that the torque exerted via the cam 44 is higher than the force of elastic reaction of the lamina 71. In such an operating step, the stem 67 is completely lowered into the passage 69, as may be seen for example in FIGS. 6 and 7.

Figure 11:
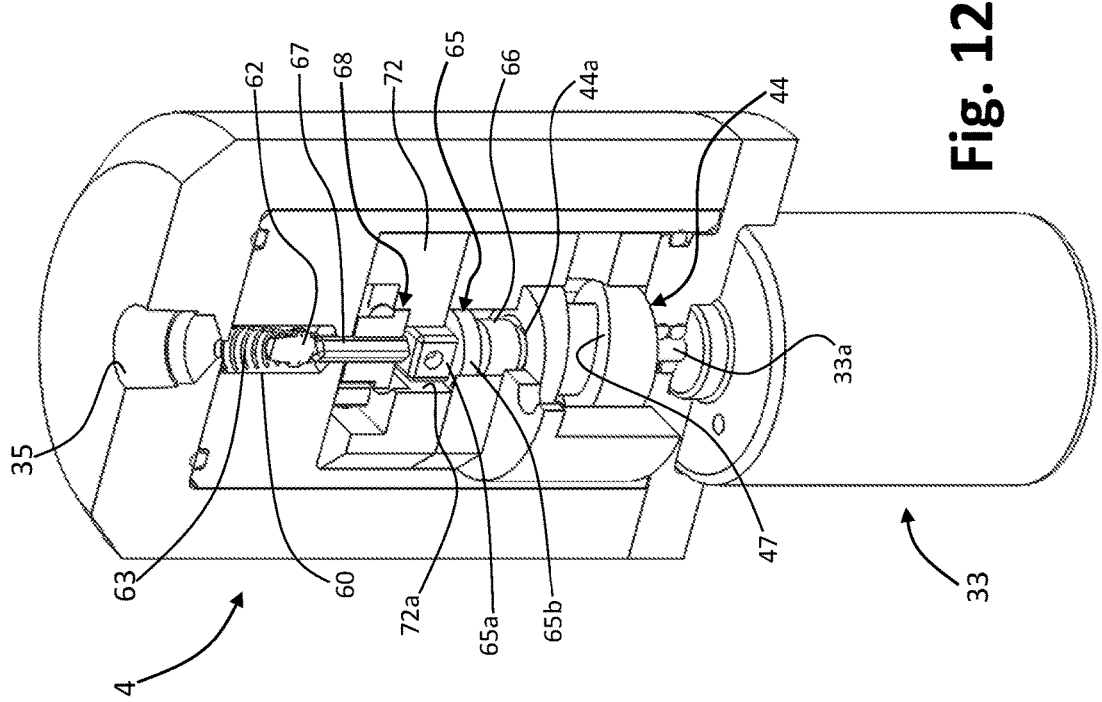
FIGS. 11 and 12 are partial and schematic sectioned perspective views of the pump of FIGS. 3-10, with a priming system in an inoperative position and an operative position, respectively.
Figure 12:
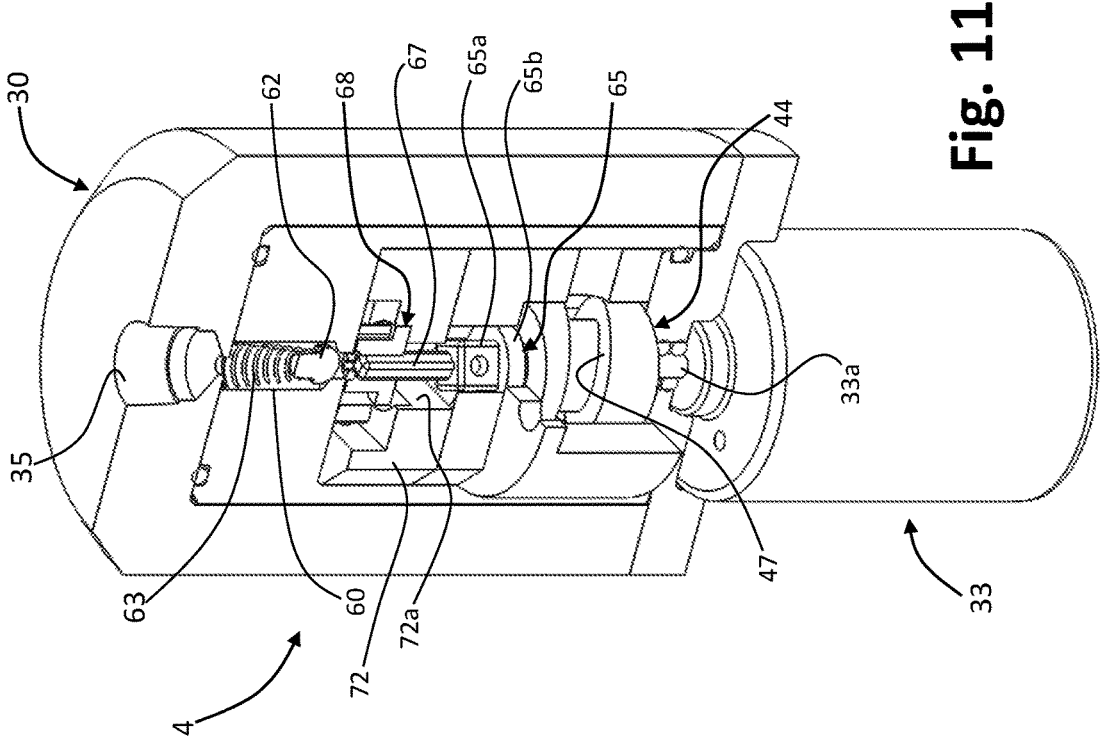
Figure 13:
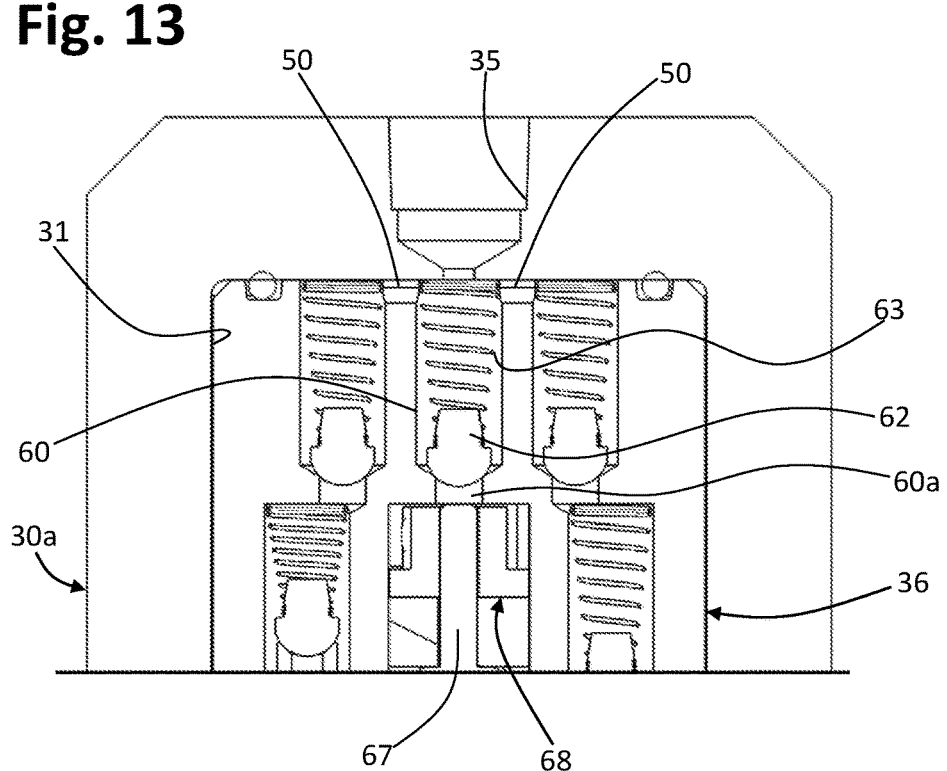
FIGS. 13 and 14 are partial and schematic cross sectional views of the pump of FIGS. 3-10, with the aforesaid priming system in an inoperative position and an operative position, respectively.
Figure 14:
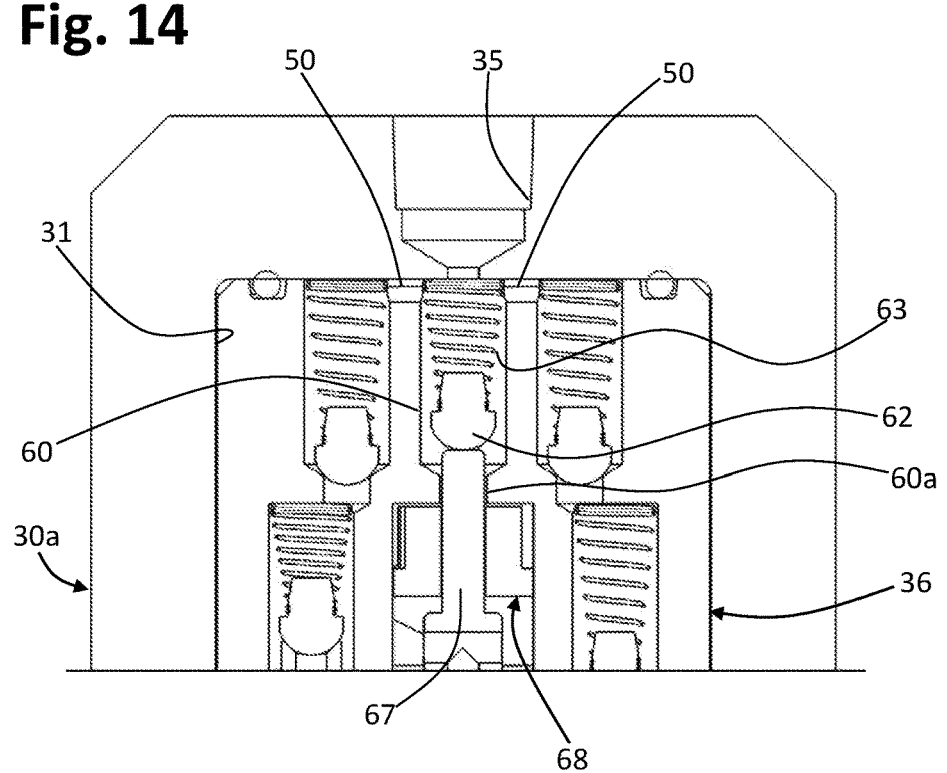

In the case where the control system issues a command for reverse rotation of the motor, the components 44, 65 and 68 tend to turn in a clockwise direction, but rotation of the arrest 68 is prevented by the ratchet mechanism, when the lamina 71 engages a tooth 70, and in this way also rotation of the pin 65 is prevented: see, for example, FIGS. 8 to 10, where the counterclockwise rotation is indicated by the arrow B. Thanks to the external-thread/internal thread coupling, the cam 44 can, instead, turn in a clockwise direction, thereby causing progressive unscrewing of the external thread 66 of the pin 65 from the internal thread 44a, as highlighted for example in FIGS. 8 and 9. Consequently, the pin 65 as a whole progressively rises. The consequent rise of the stem 67 brings about raising of the open/close element 62 against the action of the corresponding spring 63, thereby causing opening of the recirculation valve. Given that the shape and/or size of the cross section of the stem 67 are smaller than those of the port 60a, the delivery outlet 35 of the pump 4 is set in fluid communication with the cavity 39a-39b and hence, ultimately, with the intake inlet 34. FIGS. 11 and 13, on the one hand, and FIGS. 12 and 14, on the other, illustrate, precisely, the conditions of maximum lowering and maximum rise of the pin 65, corresponding to the condition of closing and to the condition of opening of the recirculation valve 62-63, respectively. In the course of rise of the pin 65 an anti-rotation system thereof is preferably activated. In particular, a prismatic portion 65a thereof—which is in an intermediate position between the external thread 66 and the stem 67—reaches a corresponding seat 72a defined in the lower part of the guide 72 (visible in FIGS. 11 and 12). This seat 72a has two opposed plane surfaces, between which the aforesaid prismatic portion 35a of the pin 65 can penetrate so as to stop rotation of the pin itself. Preferentially, the aforesaid seat 72a has at the top at least one lead-in—for example, an inclined plane—in order to favour insertion therein of the prismatic portion 65a. Also in the condition of completion of unscrewing of the external thread 66 from the internal thread 44a (FIG. 10) and with the rotation of the pin 65 prevented via the prismatic coupling 65a-72a, the cam 44 can continue to turn.

Then, the direction of rotation is reversed, i.e., the motor 33 is made to turn again in the preferential direction F (basically following the sequence of FIGS. 10, 9, and 8). The spring 63 of the recirculation valve acts on the open/close element 62, and hence on the stem 67 of the pin 65, maintaining contact between the external thread and the internal thread. The clockwise rotation of the cam 44 tends to cause a similar rotation of the pin 65 and of the arrest 68. As may be seen in particular in FIG. 12, rotation of the pin 65 towards a raised position (unscrewed) is, however, prevented by the prismatic coupling determined between the intermediate part 65a of the pin and the seat 72a. In this way, the clockwise rotation of the cam 44 determines screwing of the external thread 66 of the pin 65 into the internal thread 44a of the cam 44, causing lowering of the pin itself, which in this step is stationary. Lowering of the pin 65 thus causes release of the anti-rotation system 65a-72a referred to previously. At this point, the recirculation valve is closed, and the pin 65 and the cam 44 rotate fixedly.

The mouth of the internal thread 44a may advantageously be configured for facilitating screwing again of the external thread 66 into the internal thread 44a.

During operation of the pump 4, it may happen that air is present within one or more cylinders 68, thereby jeopardizing the effectiveness of the piston in pumping the water. In such a condition, the open/close element 52 and the corresponding spring 53 are unable to generate a pressure higher than the one present on the delivery circuit. Consequently, the valve 52-53 does not open, and there is not displacement of fluid by the pump 4. Opening of the recirculation valve 62-63, obtained in the aforesaid ways, thus enables a recirculation of water to be obtained from the delivery towards the intake of the pump 4, so as to enable the delivery pressure to be brought back to atmospheric pressure, which enables elimination of any air that may be present in the pump 4.

Of course, rotation of the motor 33 of the pump in the direction B opposite to the preferential direction F causes axial movements of the pistons 41 similar to those previously described. However, the intake and delivery pressures are homologous and, even though the pistons continue to displace water, there is no real migration of fluid between the intake inlet and the delivery outlet, with all the water that is recycled inside pump itself.

In one embodiment, the cycle of opening of the recirculation valves 62-63 is provided at the end of each delivery of a liquid product. Hence, in such a case, after insertion into the machine of a capsule 12 and closing of the brewing chamber, delivery of the beverage is started, for example by pressing a pushbutton, with the control system that starts the motor 33 in the preferential direction of rotation F. At the end of delivery (determined by pressing a pushbutton, or once a given time has elapsed after delivery of a certain amount of beverage), the control system stops the motor 33 and issues a command for a short rotation thereof in the direction opposite to the preferential direction in order to obtain opening of the recirculation valve 62-63, and hence priming of the pump, as described previously. In this condition, the water present in the duct for delivery to the delivery assembly 11 can also flow back towards the inside of the pump 4.

The condition of opening of the recirculation valve may be maintained until the next delivery of a liquid product, or else this valve can be closed again via a short actuation in the preferential direction of rotation (also closing of the valve 62-63 implies a very short actuation of the motor 33 and hence pumping of a negligible amount of liquid at the delivery 35).

The solution proposed hence enables exploitation of one and the same motor 33 to obtain opening of a valve for priming of the pump 4, and hence without specific dedicated actuators and/or complex priming arrangements.

From the above description, the characteristics of the present invention emerge clearly, as likewise the advantages afforded thereby.

It is clear that numerous variations may be made by the person skilled in the art to the machine described by way of example, without thereby departing from the scope of the invention as defined in the ensuing claims.

The thread between the external thread 66 and the internal thread 44a may be a left-hand thread, and the anti-rotation arrangement 70-71 be built so as to prevent clockwise rotation and enable counterclockwise rotation of the member 68. In this case, the operating principle described above remains the same, except for the fact that closing of the recirculation valve is obtained with a counterclockwise rotation of the cam 44 (screwing), whereas in the case of clockwise rotation thereof (unscrewing) opening of the recirculation valve is obtained.

In possible variant embodiments, the piston-holder assembly 36 may include just one cylinder 38 with a corresponding piston 41 or a number of cylinders and pistons greater than two.

The invention claimed is:

1. A machine for preparing liquid food products, comprising at least:
   a source of a liquid;
   a delivery assembly, having a brewing chamber configured for receiving a precursor of a liquid food product and for delivering the liquid food product following upon passage of the liquid through the brewing chamber;
   a pump, for pumping the liquid from the source through the brewing chamber of the delivery assembly and thereby causing delivery of the liquid food product; and
   a control system, configured for controlling an electric motor of the pump having a rotating shaft,
   wherein the pump has a pump casing with an inlet and an outlet, and a pumping arrangement therebetween, designed to be driven by the electric motor,
   wherein the electric motor is a bidirectional motor, and the control system comprises means for controlling reversal of the direction of rotation of the electric motor between a primary direction and a secondary direction;
   wherein the pump has a priming system comprising a recirculation valve and a corresponding actuation arrangement;
   wherein the pumping arrangement is pre-arranged for causing pumping of the liquid to the brewing chamber only when rotation of the electric motor occurs in the primary direction; and
   wherein the actuation arrangement is pre-arranged for causing opening of the recirculation valve following upon rotation of the electric motor in the secondary direction, to bring pressure at the outlet of the pump to atmospheric pressure.

2. The machine according to claim 1, wherein:
   defined in the pump casing is a cylinder in which a piston extends at least in part to define a variable-volume work chamber;
   present between the shaft of the electric motor and the piston is a transmission arrangement configured for causing a reciprocating movement of the piston with a predetermined stroke between an advanced position and a retracted position, and thereby varying the volume of the work chamber, the transmission arrangement comprising an actuation member, which is driven in rotation by the shaft of the electric motor and is operatively coupled to the piston,
   wherein the pump has an intake valve and a delivery valve, for connecting the work chamber in fluid communication with the inlet and with the outlet of the pump casing, respectively, the intake valve being configured for assuming an opening position and a closing position as a result of the displacement of the piston towards its advanced and retracted positions, respectively, and the delivery valve being configured for assuming an opening position and a closing position as a result of the displacement of the piston towards its retracted and advanced positions, respectively.

3. The machine according to claim 2, wherein the actuation arrangement comprises:
   a first rotating member having an upper part for control of the recirculation valve and a lower part that is coupled to the actuation member via a coupling with external thread and internal thread;
   a second rotating member, axially constrained above the lower part of the first member, the second member having an axial passage in which the upper part of the first member is engaged via a prismatic coupling;
   at least one anti-rotation arrangement, configured for enabling rotation of the second member in the primary direction and preventing rotation thereof in the secondary direction.

4. The machine according to claim 2, wherein the actuation member defines a cam path to which the piston is coupled via a corresponding cam-follower, the cam path being configured for determining the predetermined stroke of the piston between the advanced position and the retracted position.

5. The machine according to claim 2, wherein:
   defined within the pump casing is at least one further cylinder in which a respective further piston extends at least in part to define a further variable-volume work chamber;
   the pump has at least one further intake valve and at least one further delivery valve, for connecting the further work chamber in fluid communication with the inlet and with the outlet of the pump casing, respectively;
   the further piston is operatively coupled to the actuation member.

6. The machine according to claim 5, wherein
   the actuation member defines a cam path to which the piston is coupled via a corresponding cam-follower, the cam path being configured for determining the predetermined stroke of the piston between the advanced position and the retracted position;
   the further piston is coupled via a corresponding cam-follower to the cam path of the actuation member, the cam path being pre-arranged for determining the predetermined stroke of the piston and of the further piston between the respective advanced and retracted positions.

7. The machine according to claim 6, wherein the cam path is configured in such a way that to the advanced position of the piston there corresponds the retracted position of the further piston, and vice versa.

8. The machine according to claim 2, wherein the actuation member comprises a drum cam.

9. The machine according to claim 2, wherein the actuation member is rotatable according to an axis coinciding with an axis of rotation of the shaft of the electric motor.

10. The machine according to claim 2, wherein the pump casing defines a cavity housing a piston-holder assembly, which defines the cylinder.

11. The machine according to claim 2, wherein:
the piston has a proximal end and a distal end between which a through cavity extends;
the intake valve is inside the cylinder and is configured for assuming corresponding positions of opening and closing of the through cavity of the piston at the respective distal end; and
at least in the retracted position the proximal end of the piston is in a draught area defined within the pump casing.

12. The machine according to claim 1, wherein the electric motor is a d.c. motor.

13. The machine according to claim 1, wherein the control system comprises at least one from among:
means for measuring electric current absorbed by the electric motor;
means for controlling supply voltage of the electric motor; and
means for controlling rotational speed of the electric motor.

14. The machine according to claim 13, wherein the control system is pre-arranged for computing at least one from among:
pressure at the outlet of the pump, on the basis of a value of electric current absorbed by the electric motor;
r.p.m. of the motor, on the basis of a value of supply voltage of the motor and of a value of current absorbed by the electric motor;
flow rate of the pump, on the basis of the r.p.m. of the electric motor.

15. The machine according to claim 13, wherein the control system is pre-arranged for varying at least one of:
flow rate of the pump, by varying the rotational speed of the electric motor;
pressure at the outlet of the pump, by varying the supply voltage of the electric motor as a function of the electric current absorbed by the electric motor.

16. The machine according to claim 6, wherein the cylinders are in positions parallel to each other and with respect to the shaft of the electric motor.

17. The machine according to claim 5, wherein the pump casing defines a cavity housing a piston-holder assembly which defines each cylinder.

18. The machine according to claim 5, wherein:
each piston has a proximal end and a distal end between which a through cavity extends;
each intake valve is inside a corresponding cylinder and is configured for assuming corresponding positions of opening and closing of the through cavity of the corresponding piston at the respective distal end; and
at least in the retracted position the proximal end of each piston is in a draught area defined within the pump casing.

19. A machine for preparing liquid food products, comprising at least:
a source of a liquid;
a delivery assembly, having a brewing chamber configured for receiving a precursor of a liquid food product and for delivering the liquid food product following upon passage of the liquid through the brewing chamber;
a pump, for pumping the liquid from the source through the brewing chamber of the delivery assembly and thereby causing delivery of the liquid food product; and
a control system, configured for controlling an electric motor of the pump having a rotating shaft,
wherein the pump has a pump casing with an inlet and an outlet, and a pumping arrangement designed to be driven by the electric motor,
wherein the electric motor is a bidirectional motor, and the control system comprises means for controlling reversal of the direction of rotation of the electric motor between a primary direction and a secondary direction;
wherein the pump has a priming system comprising a recirculation valve and a corresponding actuation arrangement;
wherein the actuation arrangement is pre-arranged for causing opening of the recirculation valve following upon rotation of the electric motor in the secondary direction;
wherein:
defined in the pump casing is a cylinder in which a piston extends at least in part to define a variable-volume work chamber; and
present between the shaft of the electric motor and the piston is a transmission arrangement configured for causing a reciprocating movement of the piston with a predetermined stroke between an advanced position and a retracted position, and thereby varying the volume of the work chamber, the transmission arrangement comprising an actuation member, which is driven in rotation by the shaft of the electric motor and is operatively coupled to the piston;
and wherein the pump has an intake valve and a delivery valve, for connecting the work chamber in fluid communication with the inlet and with the outlet of the pump casing, respectively, the intake valve being configured for assuming an opening position and a closing position as a result of the displacement of the piston towards its advanced and retracted positions, respectively, and the delivery valve being configured for assuming an opening position and a closing position as a result of the displacement of the piston towards its retracted and advanced positions, respectively.

20. A machine for preparing liquid food products, comprising at least:
a source of a liquid;
a delivery assembly, having a brewing chamber configured for receiving a precursor of a liquid food product and for delivering the liquid food product following upon passage of the liquid through the brewing chamber;
a pump, for pumping the liquid from the source through the brewing chamber of the delivery assembly and thereby causing delivery of the liquid food product; and
a control system, configured for controlling an electric motor of the pump having a rotating shaft,
wherein the pump has a pump casing with an inlet and an outlet, and a pumping arrangement designed to be driven by the electric motor via a transmission arrangement which includes an actuation member,
wherein the electric motor is a bidirectional motor, and the control system comprises means for controlling reversal of the direction of rotation of the electric motor between a primary direction and a secondary direction;
wherein the pump has a priming system comprising a recirculation valve and a corresponding actuation arrangement;

wherein the actuation arrangement is pre-arranged for causing opening of the recirculation valve following upon rotation of the electric motor in the secondary direction; and wherein the actuation arrangement of the priming system comprises:
- a rotating member operatively coupled to the actuation member of the transmission arrangement, to rotate therewith in the primary direction when the pumping arrangement forces the liquid from the inlet to the outlet of the pump casing, and
- an anti-rotation arrangement, configured for enabling rotation of the rotating member in the primary direction and preventing rotation thereof in the secondary direction.

* * * * *